April 11, 1967     J. BAYLUK     3,313,248
STACKING FRAMES FOR PALLETS
Filed June 2, 1966     2 Sheets-Sheet 1
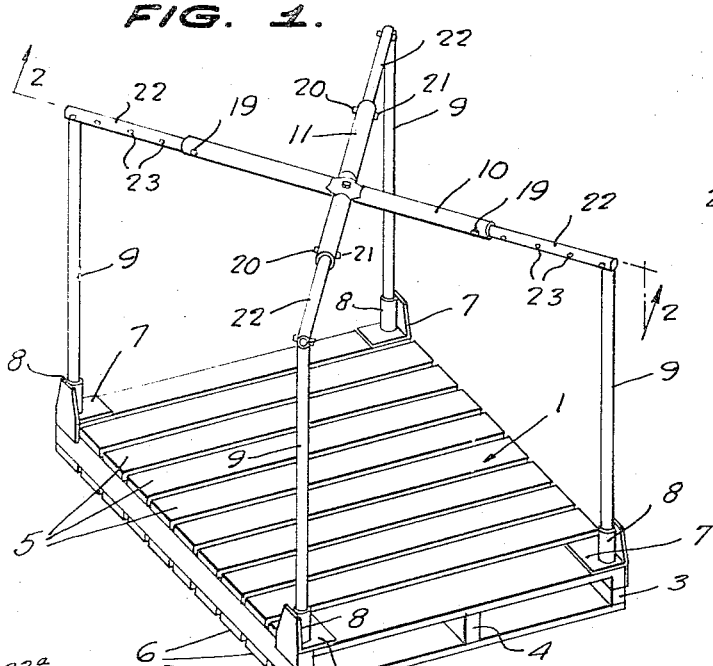
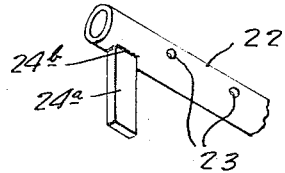
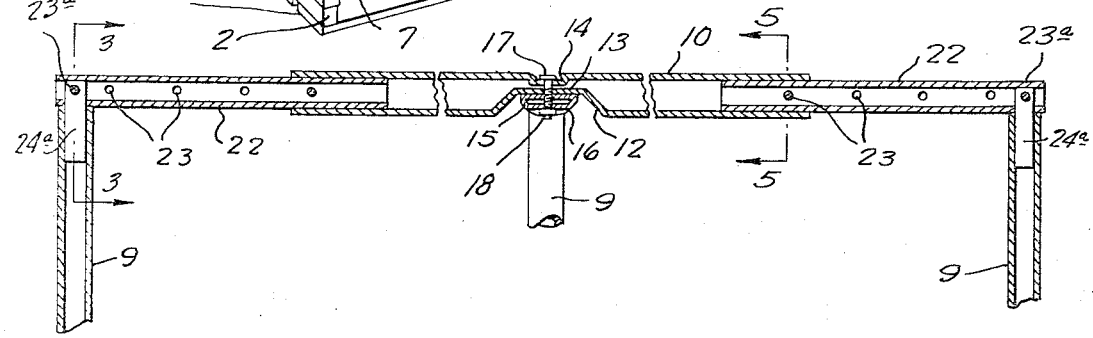
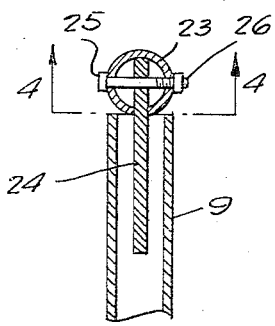
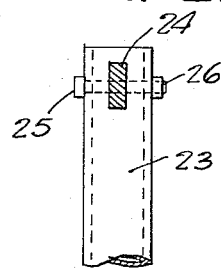
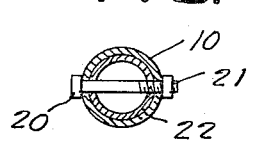
INVENTOR.
JOHN BAYLUK,
BY *Linton and Linton*
ATTORNEYS.

April 11, 1967   J. BAYLUK   3,313,248
STACKING FRAMES FOR PALLETS
Filed June 2, 1966   2 Sheets-Sheet 2
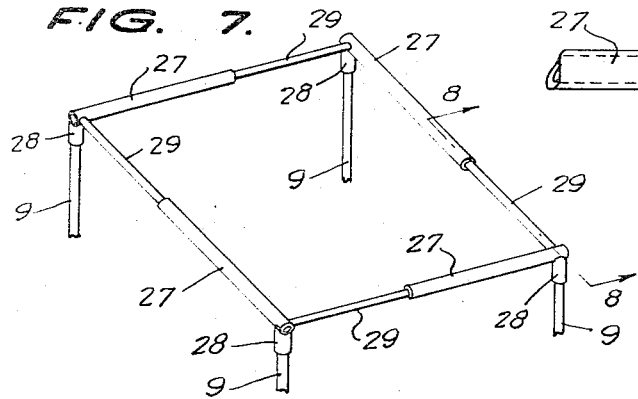
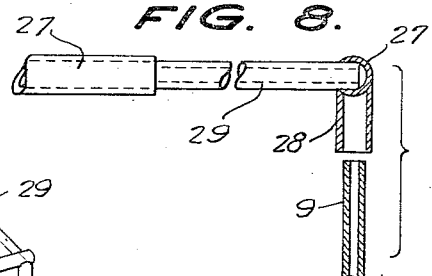
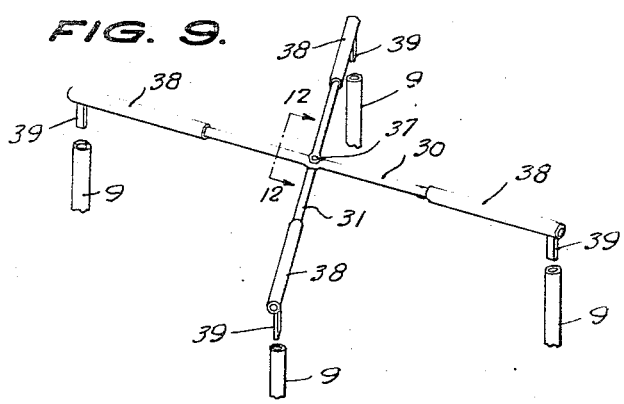
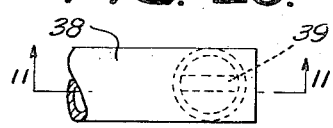
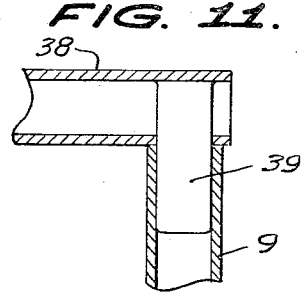
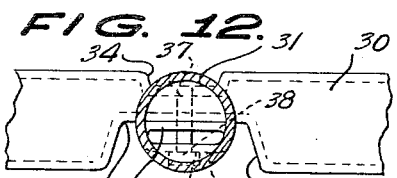
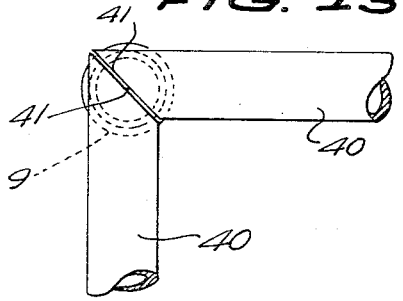
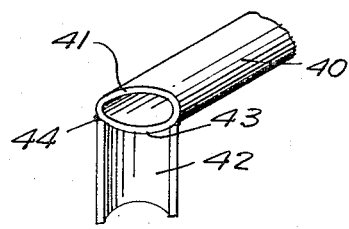
INVENTOR.
JOHN BAYLUK,
BY
*Linton and Linton*
ATTORNEYS.

3,313,248
STACKING FRAMES FOR PALLETS
John Bayluk, 4850 Wood St., Willoughby, Ohio 44094
Filed June 2, 1966, Ser. No. 554,866
11 Claims. (Cl. 108—53)

The present invention is concerned with an improvement in stacking frames for pallets.

The principal object of the present invention is to provide frames detachably mountable on pallets to enable one or more additional pallets to be mounted thereabove and which frames are mountable on pallets of given sizes or capable of being quickly and easily adjusted for having the frame mounted on each pallet of a number of different sized pallets as desired.

Another important object of the invention is to provide frame assemblies for stacking objects such as pallet assemblies above a single pallet which frame assemblies can extend crosswise or in line with the periphery of their supporting pallet, can be quickly and easily disassembled and reassembled for use on other pallets or disassembled requiring a small area for storage purposes when not in use, and are composed of a number of similar elements reducing fabricating costs.

Further objects of the invention will be in part pointed out and in part obvious in the following description of the accompanying drawings, in which;

FIG. 1 is a perspective view of one form of the present stacking frame mounted for use on a pallet.

FIG. 2 is an enlarged cross-sectional view taken on line 2—2 of FIG. 1.

FIG. 3 is a further enlarged cross-sectional view taken on line 3—3 of FIG. 2.

FIG. 4 is a cross-sectional view taken on line 4—4 of FIG. 3.

FIG. 5 is an enlarged cross-sectional view taken on line 5—5 of FIG. 2.

FIG. 6 is an end view of a modified form of an element of the present frame.

FIG. 7 is a perspective view of the top portion of a modified form of the stacking frame according to the invention.

FIG. 8 is an enlarged top view partly in section and partly exploded taken on line 8—8 of FIG. 7.

FIG. 9 is an exploded perspective view of the top portion of a still further form of the present stacking frame.

FIG. 10 is an enlarged end view of elements of the frame shown in FIG. 9.

FIG. 11 is a cross-sectional view taken on line 11—11 of FIG. 10.

FIG. 12 is an enlarged cross-sectional view taken on line 12—12 of FIG. 9.

FIG. 13 is an enlarged top view of a corner portion of another form of the present stacking frame.

And FIG. 14 is a perspective view of one of the elements of the stacking frame of FIG. 13.

Referring now more particularly to the accompanying drawings, wherein like and corresponding parts are indicated by similar reference characters, numeral 1 generally indicates a conventional pallet having side stringers 2 and 3 and a central stringer 4 connected together by a series of spaced apart parallel top slats 5 and a series of spaced apart parallel bottom slats attached to said stringers by nails, screws and the like. Pallet 1 as shown in the drawings is solely by way of an example and it is to be appreciated that pallets of different width, different depths, and different height openings can equally as well be used with the present stacking frame.

Corner post supports 7 are the same as those shown in U.S. Patent No. 3,114,339 of Dec. 17, 1963 and again are shown merely as example of conventional corner post supports which may be used with the present stacking frames. Each of said corner posts supports 7 includes a tube 8 which extends normal to the pallet top when the corner post support is affixed to a side stringer and end slat of the pallet.

The stacking frame as shown in FIGS. 1–5 inclusive have four tubular uprights 9, each capable of having an end inserted in one of said tubes 8 for being supported extending normal to the pallet at the corners thereof. A pair of tubes 10 and 11 extend cross-wise of each other and are pivotally connected. That is, tube 10 has a bottom recess provided by an annular wall 12 and bottom formed by pressing said tubes inwardly at the medial portion thereof. The opposite side of tube 10 also has a recess 14 likewise formed in the medial portion of said tube by pressing the tube inwardly towards the bottom 15. Tube 11 has a similar medial portion including bottom 15 for the bottom recess and bottom 16 for the opposite top recess. Said tube medial portions are superimposed as shown in FIG. 2 with a bolt 17 extending through their recessed portions and retained by a nut 18 in threaded engagement therewith pivotally connecting said tubes while said tube bottom recesses limit such pivoting. That is, side wall 12 for example, limits the pivoting of tube 11 relative to tube 10, but permits said tubes to be pivoted slightly so that they can extend at an angle other than 90° relative to one another. Tubes 10 and 11 have lateral openings 19 in both their end portions for receiving a bolt 20 therethrough to be retained by a nut 21 in threaded engagement with said bottom. Prior to the insertion of bolts 20 longitudinal elongated members such as rods or tubes 22 are inserted in the bore at the opposite ends of said tubes for being slideable therein. Said elongated members have lateral openings 23 capable of being positioned in line with tube openings 19 whereupon bolts 20 can then be inserted through each of the openings 19 and 23 for positioning the elongated members telescopically relative to their respective tube.

Each elongated member 22 has an anchor plate extending therein and extending normal therefrom. A bolt 25 extends through the end opening 23 of each elongated member and its inserted anchoring plate and retained by a nut 26 in threaded engagement therewith as shown in FIG. 3. Said anchoring plates 24 are capable of insertion in the top end of one of said uprights 9 for detachably supporting their elongated members and connected elements to said uprights as shown in FIG. 1 whereupon a pallet or other object can be supported upon the tubes 10 ad 11 and elongated members 22.

In order that the tubes 10 and 11 and elongated members 22 can fit pallets of different lengths and widths the elongated members 22 can be moved in and out of the tubes 10 and 11 to reach the uprights 9 and retained by the bolts 20 as well as by a tightening of nut 18.

FIG. 6 shows a modified form of elongated member 22 which has an anchoring plate 24a fastened by welding 24b to the periphery of the elongated member 22 and is used for the same purpose as anchoring plate 24.

FIGS. 7 and 8 show a further form of the stacking frame which again uses the uprights 9 attached to the pallet in the same manner as shown in FIG. 1 and which in addition has a tube 27 fixedly attached by welding, nuts and bolts, clamps or the like to a connecting member 28. Likewise an elongated member 29 capable of slideable insertion in a tube 27 is fixedly connected to one of the tubes 27 and coupling member 28 also by welding, nuts and bolts, clamps and the like or by insertion in the end of the tube 27 or coupling member 28 as shown in FIG. 8. Tube 27, coupling member 28, and elongated member 29 each can be welded together if so desired. In any event one tube 27 and an elongated member 29 extends perpendicular together and the coupling member extends perpendicular to said tube and elongated member. Each of these combination tubes, elongated member and coupling members forms a frame unit of which there are four as shown in FIG. 7 with each coupling member 28 receiving an upright 9 therein or having the coupling member 28 inserted in the bore of the upright 9 and each elongated member 29 is slideably inserted in a tube 27 of a further frame unit permitting the adjustment of said frame units to fit different sizes pallets so that the resulting frame is in line with the periphery of the pallet and can support a second pallet or other object thereon.

FIGS. 9–12 inclusive disclose a further form of the stacking frame which again uses the uprights 9 mounted upon the pallet as shown in FIG. 1 and includes a pair of elongated members such as rods or tubes 30 and 31 each capable of slideable insertion in one of the tubes 38 so that said tubes 38 are telescopically mounted thereon for adjustment to fit different size pallets. Each of said tubes 38 has an anchoring plate 39 connected in the same manner as anchoring plates 24 or 24a to tube 38 and capable of insertion in a bore of an upright 9 as shown in FIG. 11.

Said elongated members 30 and 31 have superimposed medial recesses. That is, elongated member 30 has a bottom recess provided by an annular side wall 32 and bottom 33 pressed in said elongated member and a top recess 34 pressed toward said bottom recess. Elongated member 31 has similar medial recesses with the bottom recess having a bottom 35 and the top recess a bottom 36. A bolt 37 extends laterally through said elongated members 30 and 31 in the medial portion thereof and is retained by a nut 37a in threaded engagement therewith pivotally connecting said elongated members 30 and 31, but whose pivoting is limited by recess side wall 32, for example.

FIGS. 13 and 14 show a modified form of the stacking frame of FIG. 7 and employs an elongated member such as a rod or tube 40 having an end 41 slanting relative to the longitudinal axis of its elongated member for example, on a 45° angle relative thereto, and an anchoring plate 42 of a semi-circular cross-sectional configuration and a curved top end 43 has said top end welded to the bottom of elongated member 40 by welding 44 so that said anchoring plate 42 extends normal to said elongated member and on a slant relative to the axis thereof. Said elongated member 40 can be similar to end tube 27 or elongated member 29 and used in the same manner. When mounted on an upright 9 two of the said anchoring plates 42 can fit within the bore of the upright 9 facing each other by giving the anchoring plate a size for this purpose. Thus the slanting ends 41 of the two elongated members will face one another as shown in FIG. 13 with the elongated members extending perpendicular to one another. Said elongated members 40 could then be used for supporting a second pallet or other object thereon.

In the use of the present stacking frames, corner post supports 7 are attached to the pallet as shown in FIG. 1 and uprights 9 each inserted in one of the tubes 8. Thereafter, the tubes 10 and 11 and elongated members 22 can be adjusted so that the anchoring plates 24 or 24a can be inserted each in one of the uprights.

In the case of the stacking frame of FIGS. 7 and 8 the tubes 27 each have the inserted elongated member 29 moved in or out thereof so that the coupling members 28 can each fit upon or in one of the uprights.

In the case of the stacking frame of FIGS. 9–12 nut 37a is loosened and the tubes 38 slid relative to the elongated members 30 and 31 so that the anchoring plates 39 can each be inserted in one of the uprights 9 whereupon nut 37a is tightened.

Similarly in the stacking frame of FIGS. 13 and 14 the elongated members 40 are adjusted in the same manner as tubes 27 and elongated members 29 of FIGS. 7 and 8 anchoring plates 42 inserted in the upright 9.

With each of the stacking frames so mounted upon the uprights 9 a further pallet 1 can be supported thereon with goods on the pallet or a further stacking frame as described hereinbefore thereon or other objects. In fact, a series of pallets with the present stacking frames thereon can be tiered one above the other.

The stacking frames can be easily disassembled by removing bolts 20, 25, and 37 and the remaining elements slid from one another for transportation or storage purposes thus requiring a minimum of space. Conversely they can equally as well be assembled and adjusted to different size pallets.

It is to be appreciated that the tubular and elongated elements of the stacking frames can be of other cross-sectional configurations than those shown in the drawings and besides being round, may also be of a square, rectangular, or channel shape cross-sectional material.

The present devices are capable of considerable modifications, and such changes thereto as come within the scope of the appended claims are deemed to be a part thereof.

I claim:

1. A stacking frame for pallets comprising a plurality of tubular uprights capable of being detachably mounted on and extending upright from a pallet, a plurality of telescopic elongated members and means detachably connecting each of said elongated members to a pair of said uprights extending laterally thereof.

2. A stacking frame for pallets as claimed in claim 1 wherein each of said telescopic elongated members consists of a tubular member and a pair of longitudinally extended members slideably inserted in opposite ends of said tubular member.

3. A stacking frame for pallets as claimed in claim 1 wherein each of said telescopic elongated members consists of a tubular member having a flattened medial portion and a pair of longitudinally extended members slideably inserted in opposite ends of said tubular member and the tubular members of said telescopic elongated members have their flattened medial portions superimposed and pivotally connected together.

4. A stacking frame for pallets as claimed in claim 1 wherein each of said telescopic elongated members consists of a tubular member with side openings, a pair of longitudinally extended members are slideably inserted in opposite ends of said tubular members and have side openings and means are detachably inserted through the corresponding openings of said tubular member and extended members adjustably positioning said members relative to one another.

5. A stacking frame for pallets as claimed in claim 1 wherein each of said telescopic elongated members consists of a longitudinally extended member and tubular members having said extended member slideably inserted therein.

6. A stacking frame for pallets as claimed in claim 1 wherein said telescopic elongated members extend laterally of one another and are pivotally connected.

7. A stacking frame for pallets as claimed in claim 1 wherein each of said telescopic elongated members consists of a longitudinally extended member and tubular members having said extended member slideably inserted therein and the extended members of said telescopic elongated members cross one another and are pivotally connected.

8. A stacking frame for pallets as claimed in claim 1 wherein each of said telescopic elongated members consists of a tubular member and a longitudinally extended member slideably inserted in said tubular member.

9. A stacking frame for pallets as claimed in claim 1 wherein each of said telescopic elongated members consists of a tubular member and a longitudinally extended member slideably inserted in said tubular member, the tubular member of each of said telescopic elongated members and the extended member of a second of said telescopic elongated members being fixedly connected and extending normal to one of said connecting means.

10. A stacking frame for pallets as claimed in claim 1 wherein each of said connecting means consists of an anchoring plate fixedly connected and extending normal to one of said elongated members and has a cross-sectional configuration corresponding to a portion of the interior of one of said tubular uprights for insertion therein.

11. A stacking frame for pallets as claimed in claim 1 wherein each of said elongated members has a diagonally extending end, an anchoring plate fixedly connected and extending normal to said elongated member diagonal end, said anchoring plate having a semi-circular cross-sectional configuration whereby a pair of said anchoring plates can be inserted in one of said tubular uprights with the diagonal ends of their elongated members positioned face to face.

References Cited by the Examiner
UNITED STATES PATENTS

| | | | |
|---|---|---|---|
| 3,114,339 | 12/1963 | Bayluk | 108—53 |
| 3,123,021 | 3/1964 | Evans | 108—53 |
| 3,168,060 | 2/1965 | Farley | 108—53 |
| 3,172,375 | 2/1965 | Farley et al. | 108—53 |
| 3,249,072 | 5/1966 | Skubic | 108—53 |
| 3,257,974 | 6/1966 | McMasters | 108—53 |

FRANK B. SHERRY, *Primary Examiner.*

G. O. FINCH, *Assistant Examiner.*